Feb. 6, 1962  P. GAUDILLERE  3,020,540
METHOD AND DEVICE FOR MEASURING THE
SPEED OF AN AIRCRAFT OR THE LIKE
Filed Oct. 7, 1958
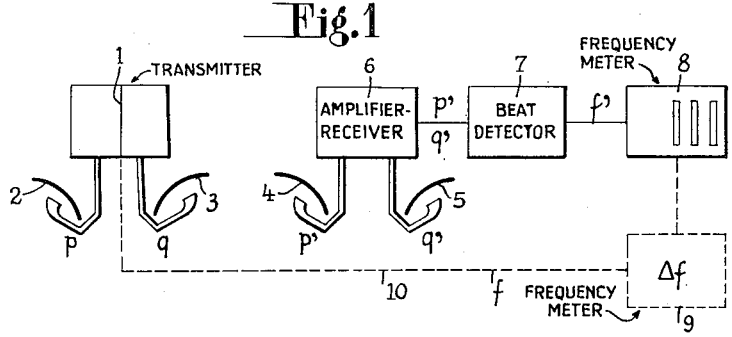
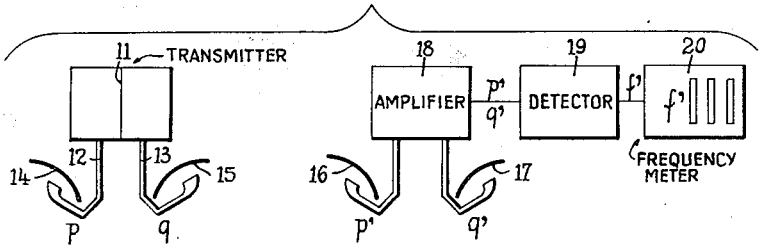
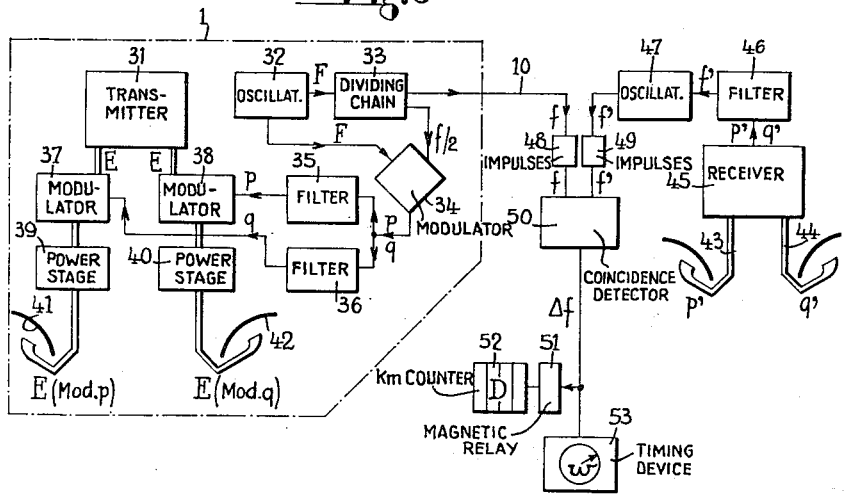
*INVENTOR:*
Pierre Gaudillere,
BY Diggins + Le Blanc.
*ATTORNEYS*

United States Patent Office 3,020,540
Patented Feb. 6, 1962

3,020,540
METHOD AND DEVICE FOR MEASURING THE SPEED OF AN AIRCRAFT OR THE LIKE
Pierre Gaudillere, 9 Rue Edouard Nortier, Neuilly-sur-Seine, France
Filed Oct. 7, 1958, Ser. No. 765,762
Claims priority, application France Oct. 11, 1957
11 Claims. (Cl. 343—8)

The invention relates to a method of measuring the speed of an aircraft or the like and to a device for carrying out said method.

It is known to measure the speed of a moving object by means of the physical phenomena known as the Doppler-Fizeau effect, according to which a signal transmitted at frequency $f$ is received at a different frequency $f'$ by any receiver which moves relative to the transmitter, the relative frequency variation $$\frac{f'-f}{f} \text{ or } \frac{\Delta f}{f}$$

being equal to the ratio $w/c$, in which $w$ is the speed of approach of the transmitter and the receiver and $c$ the speed of propagation of the signals.

It is also known to utilize for this measurement a transmission of radio waves of the centimeter band effected on board an aircraft in the form of one or a plurality of narrow beams, the signals reflected by the fixed points of the ground being received, after reflexion, on board the same aircraft.

The main difficulty of this measurement arises from the very small value of the ratio $w/c$ and, in consequence, the very small value of the relative frequency variation $\Delta f/f$. This ratio indeed remains less than a millionth for most aircraft for which $w$ is less than 1080 k.p.h. and its precise measurement presents difficult problems, for it requires that the transmission frequency be defined and stabilized with an extremely high relative precision.

The object of the invention is to remedy this difficulty and provides a method of measuring the speed of an aircraft or the like, this method comprising, for effecting this measurement, transmitting simultaneously on said aircraft two wave beams one of which is directed forwardly and the other rearwardly, the axes of said beams being inclined at the same angle $s$ below the horizontal, said waves comprising signals whose respective frequencies, that is $p$ for the forward beam and $q$ for the rear beam, differ by an amount $f=p-q$ which is small relative to $p$ and $q$, receiving on the aircraft the echoes of frequency $p'$ and $q'$ reflected by the ground, and determining or calculating the difference $f'=p'-q'$, which is the beat frequency of the two echoes, and then the variation $f=f'-f$ which variation provides the value of the speed $w$ of the aircraft, which speed is proportional to $\Delta f$.

As will be shown hereinafter, the procedure is then as though the speed were measured by means of a signal whose frequency was $f=p-q$ and whose speed of propagation was $$V = c\frac{p-q}{p+q}$$

A judicious choice of the values of $p$ and $q$ permits giving $V$ a value much smaller than $c=300,000$ km. per second. For example, this speed $V$ could be around some hundreds of km. per sec., and it could even be made less than 1 km. per sec.

The relative frequency variation $\Delta f/f$ is then of the same order of magnitude as $w/V$, that is, much higher than in the case of a direct measurement. In these circumstances, stability of the frequency $f=p-q$ can be obtained by conventional methods, the apparatus supplying nevertheless a precise measurement of the speed $w$ of the aircraft.

With $p$, $q$ and $f$ as constants, the speed $w$ is given by a relation of the form $w=k\Delta f$, where $\Delta f$ designates, as mentioned hereinbefore, the variation $f'-f$. An apparatus measuring $\Delta f$, which is conveniently graduated, can therefore directly supply the value of $w$. By judiciously choosing the values of $p$ and $q$, $k$ could moreover be given a suitable value which permits, for example, expressing $w$ in units of distance per second by the same number as the variation $\Delta f$ expressed in cycles per second, or obtaining in the range of speeds of the aircraft values of $\Delta f$ which are easy to measure with sufficient precision.

Finally, the value $\Delta f$ could be integrated so as to provide the indication of the distance passed through.

In a first manner of carrying out the method of the invention, the two beams are constituted by pure continuous waves of frequency $p$ and $q$. Preferably, these frequencies are chosen from the centimeter wave band and they differ from one another by some tens of kilocycles.

In a second manner of carrying out said method, the two beams are constituted by centimeter continuous waves modulated by oscillations of frequency $p$ for the forward beam and $q$ for the rear beam.

In a third manner of carrying out said method, the beams are constituted by infra-red transmissions modulated in amplitude by oscillations of frequency $p$ for the forward beam and $q$ for the rearward beam.

The measuring device for measuring the speed of the aircraft according to the invention comprises the following means placed on the aircraft: means for transmitting two wave beams of the type defined hereinbefore, means for receiving on the aircraft the echoes of frequencies $p'$ and $q'$ of the waves reflected by the ground, and means for measuring the best frequency $f'=p'-q'$.

Preferably, the device further comprises means for measuring and indicating the variation $f'-f=\Delta f$ by means of a graduation expressing said variation in units of speed.

According to a modification, said device comprises, in addition to means for transmitting the beams of frequency $p$ and $q$ and for receiving the echoes of frequencies $p'$ and $q'$, means for producing two series of impulses of frequencies $f=p-q$ and $f'=p'-q'$, a coincidence detector providing the frequency $\Delta f=f'-f$ of the coincidences, and counting means which counts said coincidences and permanently indicates the distance passed through. Lastly, said device could comprise permanent indicating means indicating the speed $w$ consisting of a timing device for timing the interval of time between two successive coincidences.

The calculation developed hereinafter and the description, given by way of non-limitative examples, of two ways of carrying out the method and of embodiments of corresponding apparatus, will make the object and scope of the invention more clear.

In the accompanying drawing:

FIG. 1 is a diagram of a device for carrying out the method of the invention;

FIG. 2 is a diagram of a device for carrying out the invention by means of pure continuous waves; and FIG. 3 is a diagram of a device for carrying out the invention by means of modulated continuous waves.

The principle of the method defined hereinbefore is based on the following considerations:

Let it be assumed that a first narrow beam of centimeter waves transmitted at the frequency $p$ has a beam axis directed forwardly of the aircraft and forming an angle $s$ below the horizontal. If the horizontal speed of the aircraft is $w$, the beam strikes the ground at points A which the aircraft approaches at speed $w \cos s$. A point A receives the signals of the aircraft with a frequency equal to $$p\left(1+\frac{w \cos s}{c}\right)$$

and reflects them toward the aircraft. A receiver located on the latter receives the signals with frequency $$p'=p\left(1+\frac{w \cos s}{c}\right)^2$$

that is, substantially $$p'=p\left(1+\frac{2w \cos s}{c}\right) \quad (1)$$

Let it be assumed that a second beam of centimeter waves transmitted at frequency $q$ is directed rearwardly of the aircraft in a direction to make below the horizontal the same small angle $s$ as the first beam. The waves are reflected by points B away from which the aircraft moves at speed $w \cos s$. Their echo is received on the aircraft with a frequency:

$$q'=q\left(1-\frac{2w \cos s}{c}\right)$$

If a receiver on the aircraft compares the frequencies of the two echoes from the points A and B, their difference is obtained:

$$f'=p'-q'=p-q+\frac{2w \cos s}{c}(p+q)$$

or $$f'=(p-q)\left(1+\frac{2w \cos s}{c}\frac{p+q}{p-q}\right)$$

If $$V=c\frac{p-q}{p+q}$$

and $f=p-q$ there is obtained:

$$f'=f\left(1+\frac{2w \cos s}{V}\right) \quad (2)$$

From a comparison of Formulae 1 and 2 it can be seen that all things occur as if there were transmitted forwardly of the aircraft a signal of frequency $f$ with a speed of propagation:

$$V=c\frac{p-q}{p+q}=c\frac{1}{p+q} \quad (3)$$

This speed V is defined by the values of $p$ and $q$. Thus it is sufficient to measure the difference $f'-f=\Delta f$ to obtain the speed $$w=\frac{V}{2 \cos s}\frac{\Delta f}{f} \quad (4)$$

whence:

$$w=\frac{c}{2(p+q) \cos s}\Delta f \quad (5)$$

where $c$, $p$, $q$ and $s$ are constants; this relation is of the form $w=k\Delta f$; where $k$ is a constant.

All the formulae mentioned hereinbefore are valid if the forward and rear beams transmitted carrier waves respectively modulated by oscillations of frequency $p$ (forward beam) and frequency $q$ (rear beam).

A device for carrying out said method comprises mainly (FIG. 1) a transmitter 1 on the aircraft providing two transmissions having frequencies $p$ and $q$ and constituted either by pure continuous waves of respective frequencies $p$ and $q$ or by carrier waves modulated at frequencies $p$ and $q$; these two transmissions are transmitted to two directional transmitting antennas 2 and 3 for example in the form of parabolic mirrors one of the axes of which is directed forwardly and the other rearwardly of the aircraft, these axes making the same angle below the horizontal; two receiving antennas 4 and 5, whose axes are parallel with those of the transmitting antennas, capture the echoes whose frequencies are $p'$ and $q'$ and apply them to an amplifier-receiver 6 which detects the frequencies $p'$ and $q'$, if this is the case, and transmits them to a beat detector 7 which detects the frequency $f'=p'-q'$ which is measured by a frequency meter 8.

The difference $f$ is known. The variation $\Delta f=f'-f$ can therefore be constantly calculated. It could also be determined electrically by means of a frequency meter 9; in this case the frequency $f$ is supplied to the frequency meter by the transmission part through the medium of a line 10 (shown in dot-dash line).

Two examples of carrying out the method of the invention and corresponding devices will now be described.

In the first example (FIG. 2), the transmitted frequencies $p$ and $q$ are frequencies of pure continuous waves.

The frequencies $p'$ and $q'$ received by the antennas are applied to a receiver provided with a filter which isolates the beat whose frequency $f'=p'-q'$ is measured by a frequency meter.

$f$ is so chosen that the ratio $\Delta f/f$ is for example 1/2 for the maximum speed of the aircraft. The Formula 4 therefore gives $$V=4w \text{ max. } \cos s$$

To simplify, let it be supposed that $s=60°$ whence $V=2w$ max.

For a speed $w$ max.$=0.3$ km./sec. (namely 1080 k.p.h.)
$V=0.6$ km./sec.

If for example $p+q$ is chosen to equal 20,000 megacycles the Equation 3 gives $f=40$ kilocycles.

The equation $$\frac{w}{V}=\frac{\Delta f}{f}$$

shows that for $w=0$, $f'-f$ is nil, therefore $f'=40$ kilocycles, and that for the maximum speed $f'-f$ is equal to 20 kilocycles and $f'=60$ kilocycles. In other words, a difference of 1 k.p.h. for a speed $q$ results in a variation of $f'$ in the neighbourhood of 20 cycles.

Frequency meters exist which are capable of measuring frequencies of the 1 to 100 kilocycles band with an accuracy of 1/10,000. It is therefore possible to measure $w$ to within less than 1 k.p.h.

The measuring device comprises in this case (FIG. 2):

(a) A transmission 11 supplying two distinct centimeter waves of frequencies $p$ and $q$.

(b) Two wave guides 12 and 13.

(c) Two transmitting antennas 14 and 15, of which one axis is directed forwardly and the other rearwardly of the aircraft;

(d) Two receiving antennas 16 and 17 whose axes are parallel with those of the transmitting antennas;

(e) A receiver comprising an amplifier 18 and detector circuits 19 detecting the beat of the two echoes received;

(f) A frequency meter 20 of known type measuring the frequency of this beat and indicating it for example by means of a series of neon tubes.

In the second example, the transmitted frequencies $p$ and $q$ are frequencies of modulation of a pure continuous wave.

The transmission and receiving antennas are disposed as in the preceding example and a transmitter of centimeter waves (range 10,000 megacycles) feeds the two transmitting antennas through two modulators utilizing sinusoidal oscillations whose frequencies are respectively $p$ and $q$.

The modulation can be effected either in amplitude or in frequency. This second method seems preferable because it is not sensitive to variations in the level of the echoes due to differences in the nature of the points of the ground swept by the beams.

The value $p+q$ is so chosen that the formula $$w = \frac{c}{2(p+q)\cos s}$$

$\Delta f$ is reduced to $w = \Delta f$, where $w$ and $c$ are expressed in k.p.s. and $s$ is supposed to be equal to 60°; $p+q=300$ kilocycles is obtained.

The speed $w$ is then expressed in km./sec. by the same number as the variation $\Delta f = f' - f$ of the beat frequency expressed in cycles per second.

If during a certain time interval $t$ the number of alternations of an oscillator of frequency $f = p - q$ are counted, and if the number of alternations of the beat of the two echoes received are subtracted, the frequency of this beat being $f' = p' - q'$, there is directly obtained the number of kilometers travelled through during the time interval $t$. This provides a distance measurer. If the sea mile is chosen as the unit of measure, it is sufficient to make $c = 162,000$ miles and make $p+q = 162$ kilocycles.

The same result is obtained more simply by counting the coincidences of two series of impulses of frequencies $f$ and $f'$, the frequency of these coincidences being $\Delta f = f' - f$.

The measuring device comprises in this case (FIG. 3):

(a) A conventional continuous centimeter wave transmitter 31 having a frequency E chosen from the 10,000 megacycle band.

(b) A quartz oscillator 32 having a frequency $f = 150$ kilocycles, F designating the value $$\frac{p+q}{2}$$

(c) A dividing chain 33 placed after the oscillator and providing a low frequency oscillation, the chain comprising for example two dividers dividing by 10 and a divider dividing by 5 and providing an oscillation whose frequency is $f = 300$ cycles and then, after a further division by 2, an oscillation whose frequency is $f/2 = 150$ cycles;

(d) A modulator 34 of the symmetrical or ring type which modulates the oscillation of frequency F by means of the oscillation of frequency $f/2$ so as to give two oscillations whose frequencies are respectively:

$$p = F + \frac{f}{2} \text{ and } q = F - \frac{f}{2}$$

(e) Two filters 35 and 36 separating these two oscillations of frequencies $p$ and $q$;

(f) Two modulators 36 and 38 applied separately to the carrier wave and modulating the transmissions of the forward and rear beams, these two modulators being of conventional type and capable of acting without discrimination either on the amplitude of the carrier wave or, preferably, on its frequency;

(g) Two power stages 32 and 40;

(h) Two transmitting antennas 41 and 42 radiating the two beams modulated at frequencies $p$ and $q$;

(i) Two receiving antennas 43 and 44 separately receiving the echoes modulated at frequencies $p'$ and $q'$;

(j) A receiver 45 detecting the two modulations of frequencies $p'$ and $q'$;

(k) A filter 46 isolating the oscillation of the beat which occurs between the two echoes and whose frequency is $f'$ which is in the neighbourhood of $f = 300$ cycles.

(l) A local oscillator 47 which is synchronized by the beat oscillation of frequency $f'$.

There are therefore two oscillations, one of which has a frequency $f = 300$ cycles derived from the 300 kilocycle oscillator, the other of frequency $f'$ synchronized with the beat of the echoes.

The device comprises means 48 and 49 permitting by conventional amplifying, signal clipping and derivation methods, deducing from these two oscillations two series of impulses of frequencies $f$ and $f'$ which are applied to a coincidence detector 50. The frequency of the coincidences obtained is $\Delta f = f' - f$.

These coincidences are applied to a rotating electromagnetic relay 51 known as a step-by-step motor which drives the drum of the units of a kilometer counter 52. This counter, which is set to 0 when the aircraft moves off, permanently indicates the distance D travelled through.

If it is desired to obtain a permanent indication of the speed $w$, it is sufficient to measure by means of the timing device 53 the time interval $t$ between two successive coincidences, since $$w = \frac{1}{\Delta t}$$

where $w$ is expressed in km./sec. and $\Delta t$ in seconds. If $w$ is expressed in km./hour and $\Delta t$ in milliseconds, $$w = \frac{3.6}{wt}$$

is obtained. Many known devices permit effecting this measurement, for example:

(a) An electronic counter started up by one coincidence and stopped by the following coincidence.

(b) A phantastron circuit started up by one coincidence and whose peak voltage is regulated by a servomechanism so that the instant of the discharge is synchronized with the following coincidence.

(c) A motor whose speed is regulated by a servo-mechanism so that a rotating contact driven by the motor supplies signals synchronized with the coincidences: a speedometer indicates the speed of the aircraft.

Although specific embodiments of the invention have been described, many modifications and changes may be made therein without departing from the scope of the invention as defined in the appended claims.

In particular, the invention is applicable to the use of two infra-red beams. Such beams could easily be rendered very narrow. The second example, with amplitude modulation, would be particularly well-suited to such transmissions. The equipment on the aircraft would be lighter and less space-consuming that that required when using centimeter waves.

Having now described my invention what I claim as new and desire to secure by Letters Patent is:

1. Device for measuring the speed of an aircraft or the like comprising the following means disposed on the aircraft: means for transmitting two wave beams one of which is directed forwardly and the other rearwardly of the aircraft, the axes of said beams being downwardly inclined at the same angle from the horizontal, said waves comprising signals whose respective frequencies, that is, the frequency $p$ for the forward beam, and $q$ for the rear beam, differ from one another by an amount $f = p - q$ which is small relative to $p$ and $q$, means for receiving on the aircraft the echoes of frequency $p'$ and $q'$ of the waves reflected by the ground, and means for measuring the frequency $f' = p' - q'$.

2. Device for measuring the speed of an aircraft or the like comprising the following means disposed on the aircraft: means for transmitting two wave beams one of which is directed forwardly and the other rearwardly of the aircraft, the axes of said beams being downwardly inclined at the same angle from the horizontal, said waves comprising signals whose respective frequencies, that is, the frequency $p$ for the forward beam, and $q$ for the rear beam, differ from one another by an amount $f = p - q$ which is small relatitve to $p$ and $q$, means for receiving on the aircraft the echoes of frequency $p'$ and $q'$ of the waves reflected by the ground, means for measuring the difference $\Delta f = f' - f$ which is proportional to the speed of the aircraft, $f'$ being the frequency difference $p' - q'$.

3. Device for measuring the speed of an aircraft or the like comprising the following means disposed on the aircraft: means for transmitting two wave beams one of which is directed forwardly and the other rearwardly of the aircraft, the axes of said beams being downwardly inclined at the same angle from the horizontal, said waves comprising signals whose respective frequencies, that is, the frequency $p$ for the forward beam, and $q$ for the rear beam, differ from one another by an amount $f=p-q$ which is small relative to $p$ and $q$, means for receiving on the aircraft the echoes of frequency $p'$ and $q'$ of the waves reflected by the ground, means for measuring the variation $\Delta f=f'-f$, $f'$ being the frequency difference $p'-q'$, and means for indicating the value of $\Delta f$, the last-mentioned means expressing this value in units of speed of the aircraft.

4. Device for measuring the speed of an aircraft or the like comprising the following means disposed on the aircraft: means for transmitting two wave beams one of which is directed forwardly and the other rearwardly of the aircraft, the axes of said beams being downwardly inclined at the same angle from the horizontal, said waves comprising signals whose respective frequencies, that is, the frequency $p$ for the forward beam, and $q$ for the rear beam, differ from one another by an amount $f=p-q$ which is small relative to $p$ and $q$, means for receiving on the aircraft the echoes of frequency $p'$ and $q'$ of the waves reflected by the ground, means for producing two series of impulses of frequencies $f=p-q$ and $f'=p'-q'$, a coincidence detector providing the frequency $\Delta f=f'-f$ of the coincidences, and means which counts said coincidences and permanently indicates the distance travelled through by the aircraft.

5. Device for measuring the speed of an aircraft or the like comprising the following means disposed on the aircraft: means for transmitting two wave beams one of which is directed forwardly and the other rearwardly of the aircraft, the axes of said beams being downwardly inclined at the same angle from the horizontal, said waves comprising signals whose respective frequencies, that is, the frequency $p$ for the forward beam, and $q$ for the rear beam, differ from one another by an amount $f=p-q$ which is small relative to $p$ and $q$, means for receiving on the aircraft the echoes of frequency $p'$ and $q'$ of the waves reflected by the ground, means for producing two series of impulses of frequencies $f=p-q$ and $f'=p'-q'$, a coincidence detector providing the frequency $f=f'-f$ of the coincidences, means which counts said coincidences and permanently indicates the distance travelled through by the aircraft, and means for permanently indicating the speed, the last-mentioned means comprising a timing device for timing the time interval between two successive coincidences.

6. Device as claimed in claim 1 wherein the means for transmitting the frequencies $p$ and $q$ are such that the ratio $$\frac{p-q}{p+q}$$

is less than $10^{-3}$.

7. Device as claimed in claim 1, wherein the means for transmitting the frequencies $p$ and $q$ are such that the ratio $$\frac{p-q}{p+q}$$

is less than $10^{-5}$.

8. Device as claimed in claim 1, wherein the two beams are constituted by pure continuous waves whose frequencies are $p$ and $q$ respectively.

9. Device as claimed in claim 1, wherein the two beams are constituted by pure continuous waves selected from the centimeter wave band and differing from one another by a few tens of kilocycles per second.

10. Device as claimed in claim 1, wherein the two beams are constituted by centimeter continuous waves modulated by oscillations of frequencies $p$ and $q$ respectively.

11. Device as claimed in claim 1, wherein the two beams are constituted by infra-red transmissions which are amplitude-modulated by oscillations having frequencies $p$ and $q$ respectively.

References Cited in the file of this patent

UNITED STATES PATENTS

| | | |
|---|---|---|
| 2,422,064 | Anderson | June 10, 1947 |
| 2,455,639 | Anderson | Dec. 7, 1948 |

UNITED STATES PATENT OFFICE
CERTIFICATE OF CORRECTION

Patent No. 3,020,540                          February 6, 1962

Pierre Gaudillere

It is hereby certified that error appears in the above numbered patent requiring correction and that the said Letters Patent should read as corrected below.

Column 1, lines 19 to 21, the formula should appear as shown below instead of as in the patent:

$$\frac{f'-f}{f} \text{ or } \frac{\Delta f}{f}$$

column 5, line 30, for "f=150" read -- F=150 --; column 6, line 44, for "that", first occurrence, read -- than --; line 71, for "relatitve" read -- relative --.

Signed and sealed this 3rd day of July 1962.

(SEAL)
Attest:

ERNEST W. SWIDER                          DAVID L. LADD
Attesting Officer                          Commissioner of Patents